United States Patent [19]

Lorphelin

[11] 4,177,643

[45] Dec. 11, 1979

[54] METHOD FOR COLLECTING ENERGY FROM SWELL AND PLANT FOR CARRYING OUT SAID METHOD

[76] Inventor: Michel Lorphelin, 5 rue Denis-Poisson, 75017 Paris, France

[21] Appl. No.: 846,123

[22] Filed: Oct. 27, 1977

[30] Foreign Application Priority Data

Nov. 2, 1976 [FR] France ............................... 76 33012

[51] Int. Cl.² ............................................. F03B 13/12
[52] U.S. Cl. ........................................ 60/496; 60/506; 417/332
[58] Field of Search .................................. 60/495–497, 60/500, 501, 505, 506; 290/42, 53; 417/330, 331, 332

[56] References Cited

U.S. PATENT DOCUMENTS 1,156,355 10/1915 Fisher ................................... 417/331

4,081,962 4/1978 Liv et al. ............................ 60/501 X

FOREIGN PATENT DOCUMENTS 181431 6/1922 United Kingdom ....................... 60/500

*Primary Examiner*—Allen M. Ostrager
*Assistant Examiner*—Stephen F. Husar
*Attorney, Agent, or Firm*—Lerner, David, Littenberg & Samuel

[57] ABSTRACT

A method and apparatus for collecting energy from a swell in a fluid medium using a mobile float which is displaceable in response to movements of the swell. The float is submergible in the fluid medium at a predetermined depth selected such that, in the absence of movement of the fluid medium, the upwardly and downwardly directed forces acting on the float counterbalance each other so that the float is in equilibrium at such predetermined depth. The buoyancy of the float is adjusted to maintain it in equilibrium.

20 Claims, 7 Drawing Figures

U.S. Patent  Dec. 11, 1979  Sheet 1 of 5  4,177,643
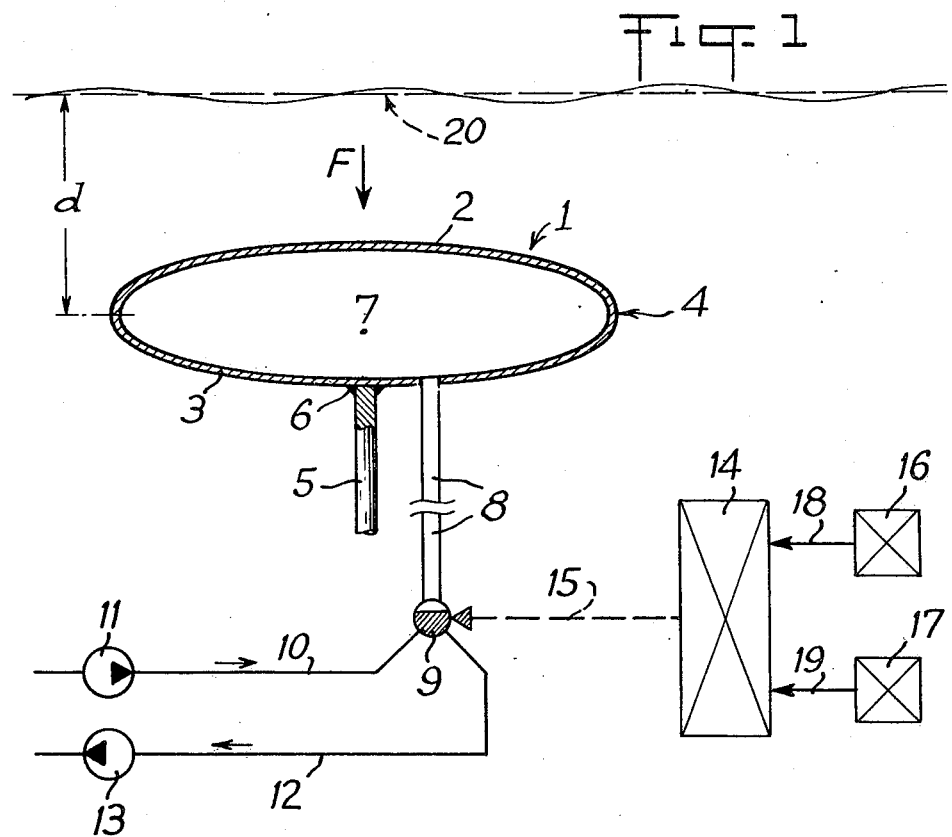
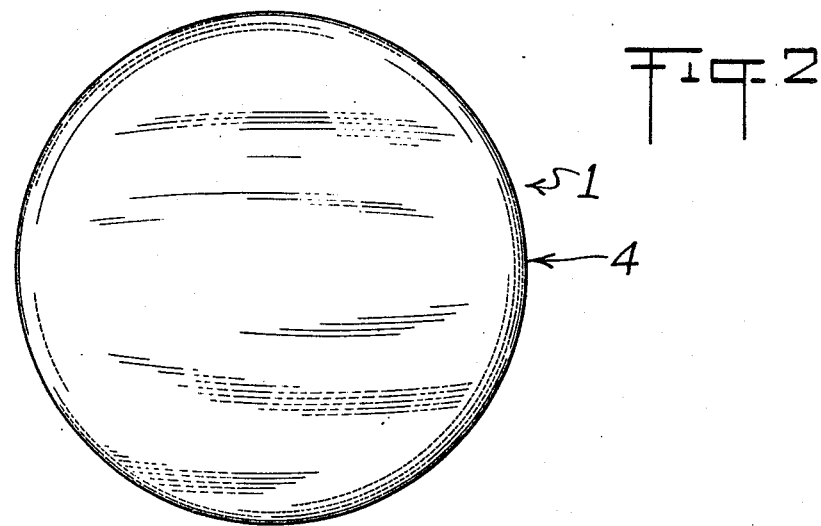

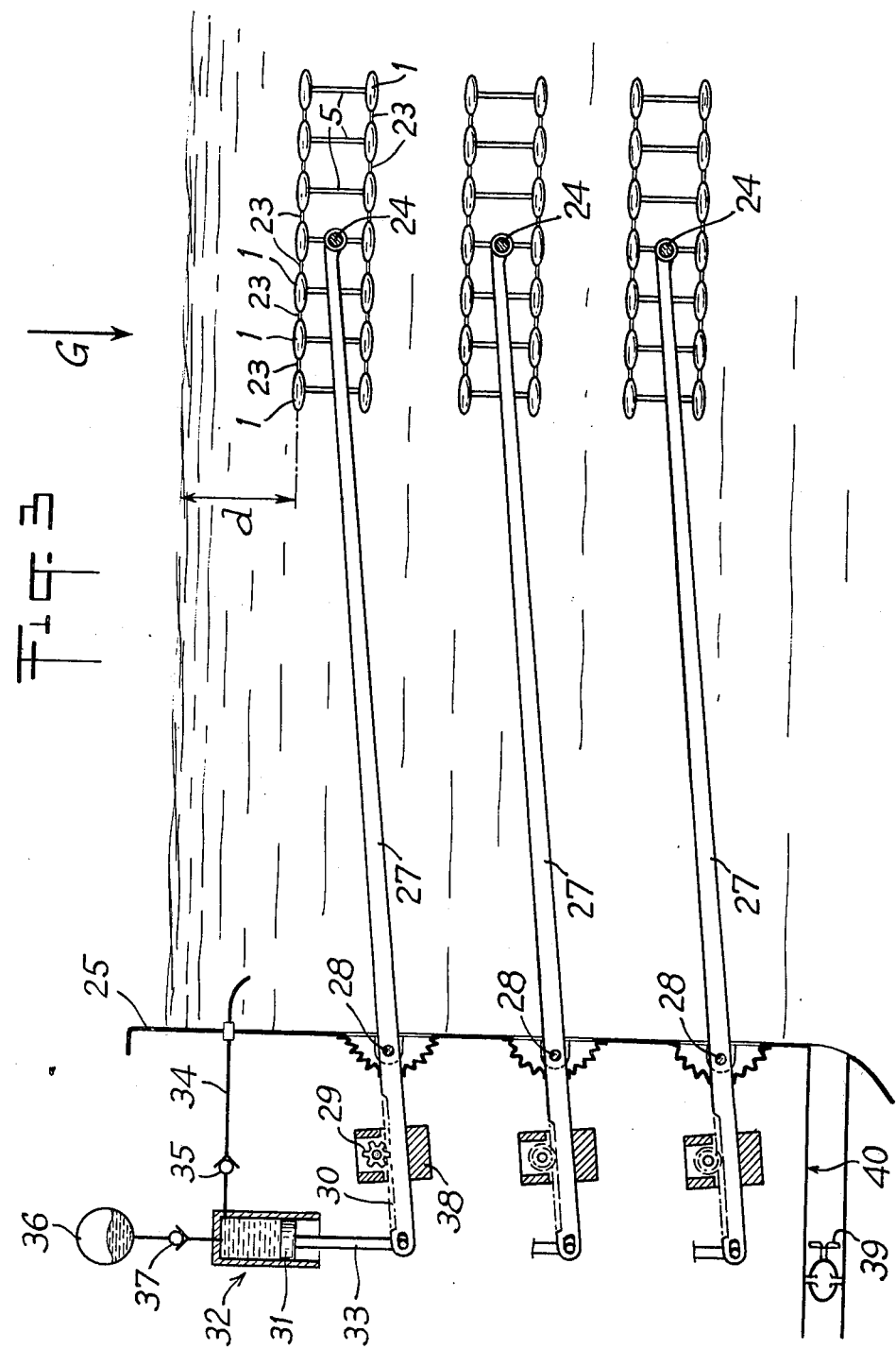

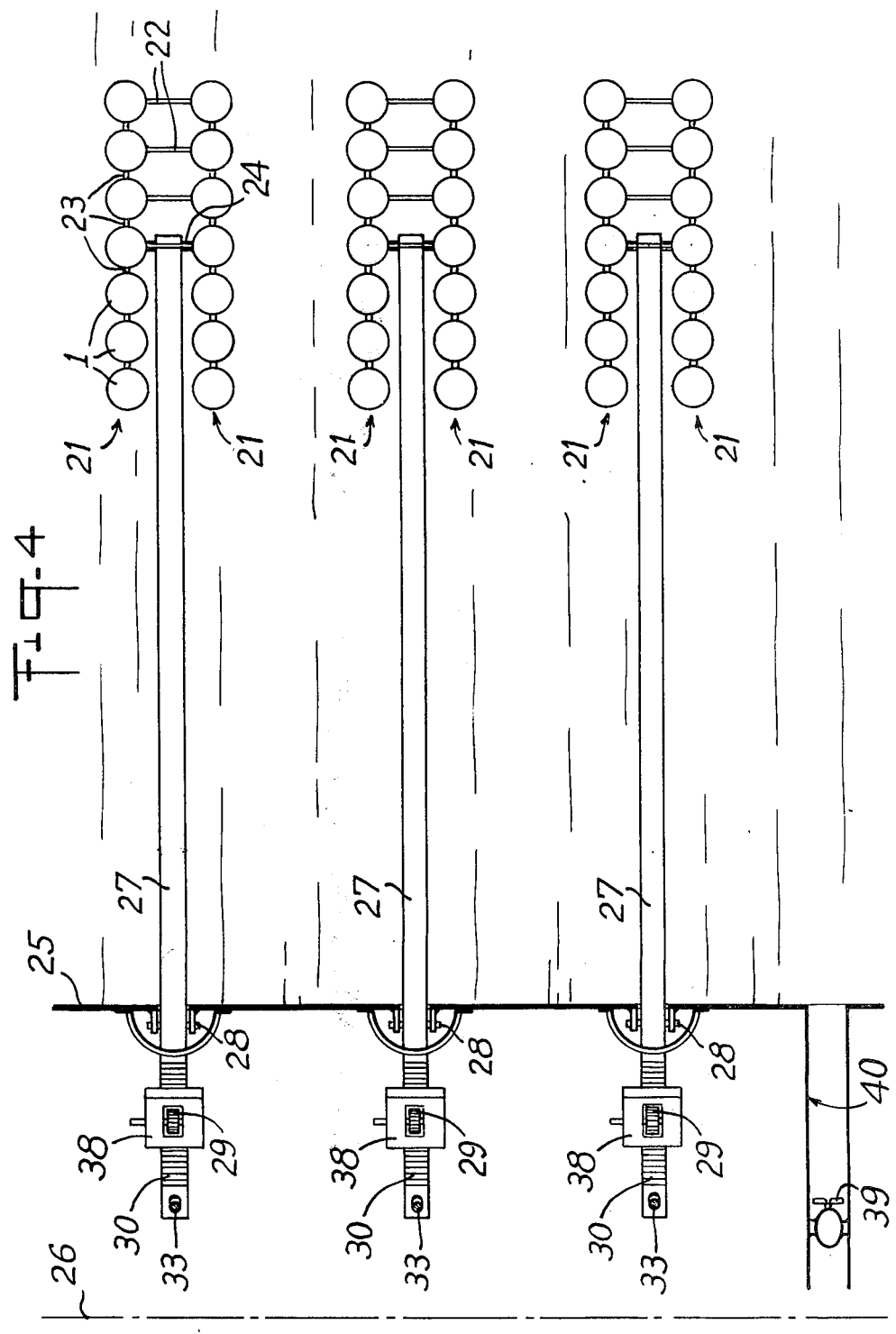

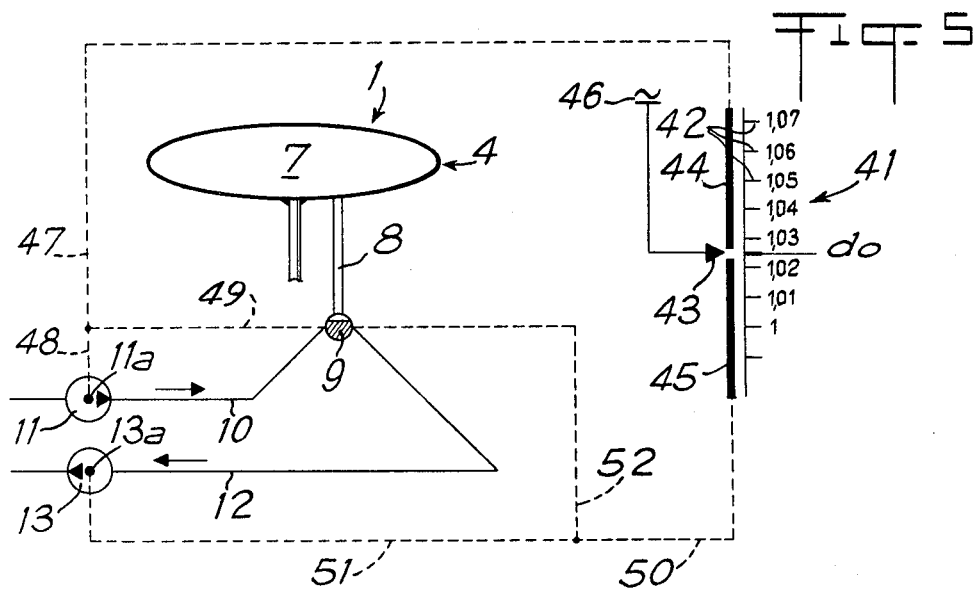
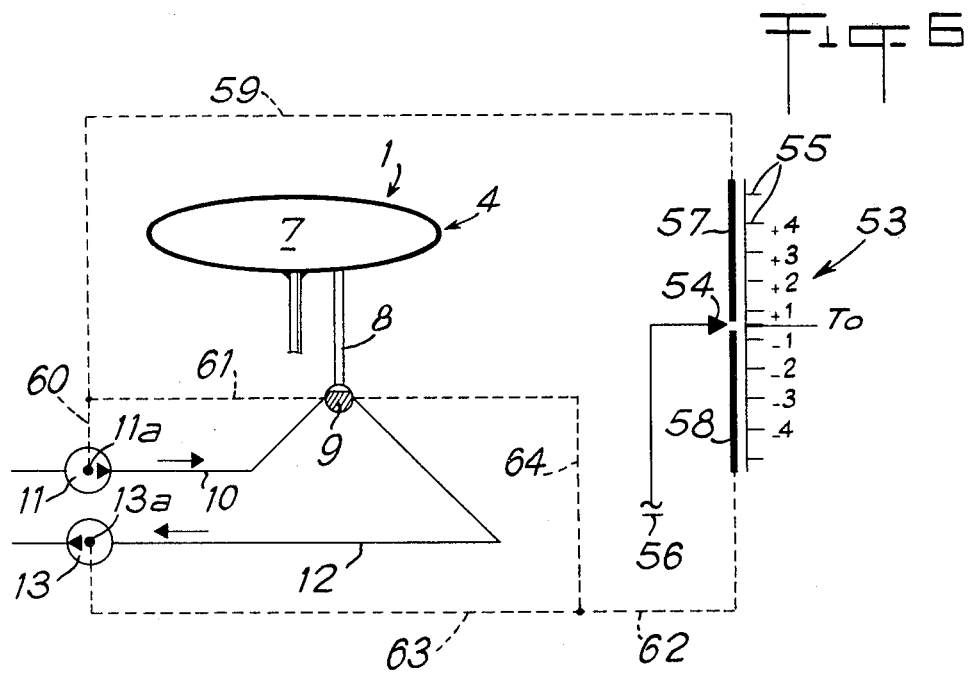

METHOD FOR COLLECTING ENERGY FROM SWELL AND PLANT FOR CARRYING OUT SAID METHOD

The present invention relates to a method for collecting energy from a swell and to a plant for carrying out said method.

The recovery of part of the energy from a swell has already been proposed.

According to a known technique, the recoverable energy is the kinetic energy and, in practice, the vertical component of this energy, as this component is the easiest to pick up and depends little on the direction of the swell.

Heretofore proposed devices are essentially constituted by floats resting on the surface of the fluid mass, which therefore collect the energy of the waves.

Now, it is known that said waves are only the superficial manifestation of the complete movement of the fluid mass and, from the point of view of energy, are only a part thereof, since the energy contained in the waves can be estimated at about three percent of the total energy.

It should be noted that the question of transmission of the displacement of a float to an energy-collecting plant has been solved in various ways, by chain or by beam, to a fixed or floating plant, by means of hydraulic circuits functioning by pumping, or by means of mechanical mechanisms of the crank-connecting rod type.

Starting from this state of the art, the invention firstly involves a novel method; the energy recovered will not be simply the surface energy contained in the movement of the waves, but the energy of the fluid located from the surface to a certain non-zero distance therefrom, to be determined by calculation. In this way, one is basically certain of recovering much more energy than the energy recoverable by the known processes. Calculation shows that, between the surface and a depth $L/2\pi$ (where L=the half-wave length of the swell and $\pi$ is a constant of 3.14), for example, approximately ten times more energy may be recovered than the surface energy.

The invention therefore relates to a method for collecting energy from swell, according to which at least one mobile float animated by the movements of said swell is used, and each float is connected to a plant converting the displacement of said float into another energy, such as electrical energy, each float being submerged in the very mass of the fluid at a depth where, in the absence of movement of this fluid mass, the upwardly and downwardly directed forces acting on the float counterbalance each other so that the float is in equilibrium at such depth.

According to this method, the floatability or buoyancy of each float is adjusted substantially permanently, to the value maintaining it in this equilibrium.

Advantageously,
a plurality of floats are integrally joined together to form a single unit, said floats being disposed in at least one horizontal row;
at least two floats are integrally joined together, one being arranged above the other in spaced-apart relationship, and constituting a single unit.

It is also an object of the invention to provide a plant for collecting the energy from swell, carrying out the method as defined hereinabove.

This plant comprises one or more of the following features:
each float is constituted by a flattened body;
each float is constituted by a disc-shaped body;
said body comprises an internal cavity to which is connected a fluid inlet and delivery conduit;
each float is connected to the plant by being coupled to a beam pivoted on the framework of this plant;
each float is mounted to pivot on said beam;
a weight is fixed to that part of said beam opposite the float with respect to the pivot axis of said beam;
said weight is fixed in an adjustable position;
at least one float or all the floats are provided with a device for automatically adjusting its equilibrium comprising a densimeter measuring the density of the water and a so-called swell-meter measuring the period of the swell, the signals from which control the said adjusting device;
said plant is floating;
said plant is provided with a device for adjusting its bearing.

The invention will be more readily understood on reading the following description with reference to the accompanying drawings, in which:

FIG. 1 is a section through a vertical plane of an submerged float of a plant according to the invention;

FIG. 2 is a view in the direction of arrow F of FIG. 1;

FIG. 3 is a section through a vertical plane of a plant according to the invention;

FIG. 4 is a view in the direction of arrow G of FIG. 3; and

FIGS. 5, 6 and 7 are connection diagrams in accordance with the invention.

Figure 7:
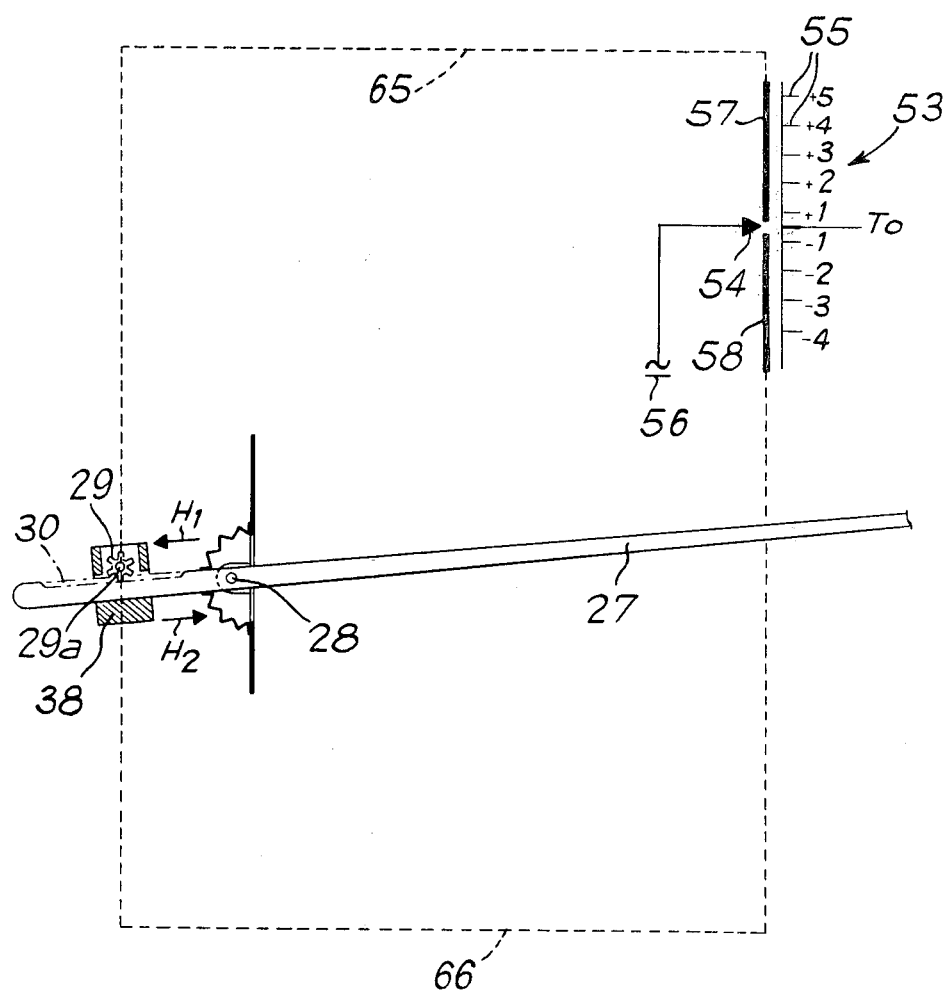

Referring now to the drawings, FIGS. 1 and 2 show a plant for carrying out the method according to the invention, which comprises at least one, and generally a plurality of floats, such as float 1.

This float 1 is defined by two substantially horizontal walls 2 and 3, circular in shape, slightly convex and joined at their periphery so as to constitute a hollow disc.

The joined edge 4 of these walls is externally rounded. At the center of the outer face of the lower wall 3, a rod 5 for fixing the float is fixed, by welding 6 or any other means.

Furthermore, to the inner cavity 7 of the float there is connected a pipe 8 leading to a three-way valve 9. The valve is also connected to the delivery conduit 10 of a pump 11 and to the suction conduit 12 of a pump 13.

The selection of one of the three possible positions of the valve is made by a calculating device 14 to which said valve is connected by a connection 15. The device 14 receives and processes the indications of the measurements made by an electric swell-meter 16 and by an electric densimeter 17, to which it is connected by connections 18, 19, respectively.

The three positions of the valve 9 correspond as follows:
the first position corresponds to the isolation of each of conduits 8, 10, 12 with respect to the other two;
the second position, to the communication of conduits 8 and 10 and to the obturation of conduit 12; and
the third position, to the communication of conduits 8 and 12 and to the obturation of conduit 10.

When the valve is placed in one of its second and third positions, it allows the injection into the cavity 7, or suction therefrom, of a quantity of fluid determined by the calculating device 14 so that, as a function of the period of the swell, measured by the swell-meter 16, and of the density of the water at the moment in question, measured by the densimeter 17, the upwardly and downwardly directed forces acting on the float counterbalance each other so that the float is in equilibrium at distance D from the mean surface 20 of the water at which it is disposed, this being important for the collection of the energy by the float.

It is to be noted that, in all cases, the distance D is not zero, the float being effectively submerged, and may reach, for example, about L/6, L being the half-wave length of the swell, as is stated hereinabove.

In fact, there are, in practice, always several floats 1 which are grouped in horizontal rows 21. The floats of two rows 21 may be assembled in pairs by their common rod 5, the two rows being parallel to each other and superposed. In addition, two such groups of two superposed rows may advantageously be connected by horizontal rods 22 connecting two floats located at the same depth. Furthermore, the floats of the same row are connected by rods 23. Finally, a horizontal rod 24 connects the centers of two vertical rods 5 of floats of separate groups of two rows and is parallel to the rods 22.

The plant shown is constituted by a floating vessel 25, on whose structure are laterally pivoted, about axes 28 parallel to the longitudinal axis 26 of the vessel, beams 27 on whose outer end a group of four rows of floats, as described hereinabove, is pivoted by means of rod 24, parallel to axis 26.

A weight 38 is mounted to slide on the end of each beam 27 located inside the vessel 25, on the side opposite the floats 1 with respect to axis 28. The position of this weight 38, acting as a counterweight, is furthermore adjustable by means of a pinion 29 mounted to rotate on said weight 38, meshing with a rack 30 fast with the beam 27.

The member converting the energy of the moving beam into another energy is of any known type. FIG. 3 schematically shows a type in which the piston 31 of a pump 32 is coupled to the inner end of the beam 27 by a connecting rod 33, said pump drawing the water outside the vessel 25 through a conduit 34 and an intake valve 35 and delivering the water into a pressurized fluid accumulator 36 through its delivery valve 37.

Finally, the orientation or bearing of the vessel, anchored to the sea bed, is adjustable by means, in a known manner of screw propellers 39 disposed inside transverse conduits 40.

It must further be noted that the average position of the weight 38 may be controlled by the connection 15 coming from the calculating device, thus replacing the adjustment of the floatability of the floats 1 by intake or extraction of fluid in or from their cavities 7.

The advantages of the invention will now be set forth.

Firstly, the floats are submerged to a depth where they take up a large part of the energy of the swell, without the installation being too expensive. In fact, the optimum depth is the result of a compromise between that part of the energy sacrified by the floats being only submerged to a relatively small depth (for example 15 meters), in order to have an economical installation, and the anticipated gain in energy from the choice of a greater depth but which leads to a high construction cost.

The constitution and shape of the floats allow a satisfactory flow of the fluid streams along the outer surfaces of the walls of said floats and contribute to obtaining advantageous yields.

The adjustment of the floatability or buoyancy of the floats, either individually or when said floats are grouped, is to be noted.

Of course, a plurality of beams are distributed along the plant, not only superposed on one another but also spaced out along the side of the vessel 25.

The adjustment of the orientation or bearing of the plant enables the beams to be arranged substantially in the direction of propagation of the swell, to which the maximum efficiency of the floats corresponds.

Furthermore, the weight 38 mounted on each beam 27 allows a fine balancing of the floats with a view to fighting against the inertia of the moving masses and to harmonizing the movements of said masses with those of the swell.

The following points should also be noted:

the proposed method therefore enables changeable, unforeseeable and irregular natural movements to be converted into a continuous movement of progressively variable intensity, by integration of the elementary movements;

the means carried out are conventional: they do not raise any unknown problem and must therefore be rapidly rendered operational;

the method is very simple and consequently offers reliability and reduced maintenance;

the general design of the plant as a floating vessel is also simple; moreover, it enables a good part to be constructed on the slips and therefore to limit the cost of production thereof;

the source of energy is free, since it is a natural phenomenon; it is also virtually infinite, which allows the creation of a large number of plants without fear of shortage;

the plant is perfectly clean; the rejection of water and production of electric current, for example, do not cause any pollution;

all the floats being submerged, the appearance of the plant may be architecturally aesthetic, which would not mar the natural environment. The plant may also be fairly well camouflaged.

Furthermore, from the point of view of the applications to which the present invention may be put, if it is advantageous to create fixed floating plants (even if they are orientable), it is quite possible to limit the mobility of the hull, with the understanding that the swell-actuated motor may serve to propel the vessels.

In the case of the motor with beams and water pumps, the suction is effected through the bows, rejection through the stern: the two combine by double reaction on the aquatic medium to cause the hull to advance without other intervention.

This application having effect only when there is swell, it would be judicious to provide a conventional auxiliary propelling means for calm weather.

In brief, the interest of such methods resides in their advantages: unlimited resources, always renewed, no waste, no noise, simplicity, reliability, high power.

A development of this technique would therefore make it possible to find an advantageous substitute—much distributed in the world—for present energy, which particularly interests developing countries.

FIGS. 5 to 7 show devices for adjusting the equilibrium of the floats 1 using densimeters and swell-meters and for adjusting the period of oscillation of the beams 27.

With reference to FIG. 5, a densimeter 41 is shown schematically by its graduation 42, the mobile index 43 indicating the density measured, two plates 44 and 45 for electrical connection, corresponding to the densities higher and lower respectively, than a reference density d0. The index 43 is connected to a source of electric current 46. Furthermore, the plate 44 is connected (47 and 48) to the motor 11a of the pump 11 and is connected (47 and 49) to the valve 9 to control the communication of conduits 8 and 10 when the index 43 is in contact with this plate 44. Similarly, the plate 45 is connected (50 and 51) to motor 13a of pump 13 and is connected (50 and 52) to the valve 9 to control the communication of conduits 8 and 12 when the index 43 is in contact with the plate 45. In this way, the introduction of an addition of water in the float 1 corresponds to the detection of a rise in the density and, inversely, an evacuation of water from the float 1 corresponds to the detection of a reduction in density. The density varying only slowly in time, the correction of the weight of the water contained in the float 1 may only be intermittent, whilst arriving at a substantially permanent adjustment of its floatability or buoyancy.

The synchronisation of the periods of the swell and the beam must also be ensured. This is possible with the swell-meter 53 of FIG. 6, the index 54 of which moves opposite the graduation 55 and is connected to a source of electric current 56. Two plates 57 and 58 are placed on either side of the indication of a reference period To and correspond to swell periods respectively higher and lower than To. The plate 57 is connected (59 and 60) to motor 11a of the pump 11 and (59 and 61) to the valve 9 to control the communication of conduits 8 and 10, when the index 54 is in contact with this plate 57. The plate 58 is connected (62 and 63) to the motor 13a of the pump 13 and (62 and 64) to the valve 9 to control the communication of conduits 8 and 12, when the index 54 is in contact with this plate 58. In this way, the weight of the water contained in the float 1 and consequently the actual period of oscillation of the beam 27 and the floats which are coupled thereto may be adjusted to render it compatible with the measured period of the swell. This adjustment may function permanently during the rise and fall of the floats 1.

The device of FIG. 7 is similar to that of FIG. 6. The plates 57 and 58 of the swell-meter 53 are connected (65) and (66) to the motor 29a of the pinion 29 to displace the weight 38 in the direction of arrow $H_1$ or in the direction of arrow $H_2$, respectively. The result obtained is similar to that obtained by the device of FIG. 6. However, the device of FIG. 7 may be preferred to that of FIG. 6, in certain cases, as it allows an adjustment of the period independent of the adjustment of equilibrium of the floats 1.

The densimeter 41 and swell-meter 53 mentioned hereinabove are conventional apparatus which are already known.

What is claimed is:

1. A method of collecting energy from a swell in a fluid medium using a mobile float which is displaceable in response to movements of the swell, comprising the steps of submerging the float in a fluid medium at a predetermined depth, said predetermined depth being selected such that, in the absence of movement of the fluid medium, the upwardly and downwardly directed forces acting on the float counterbalance each other so that the float is in equilibrium at such predetermined depth, and adjusting the buoyancy of the float so as to maintain it in equilibrium.

2. A method according to claim 1, wherein the buoyancy of the float is adjusted automatically.

3. A method according to claim 2, wherein the automatic adjustment of the buoyancy of the float is in response to changes in density of the fluid medium and in the period of the swell.

4. A method according to claim 1, further comprising the step of converting the displacement of the float into another form of energy.

5. A method according to claim 1, wherein the buoyancy of the float is adjusted by changing the mass of the float itself.

6. A method according to claim 1, wherein the buoyancy of the float is adjusted by changing the position of a weight attached to the float.

7. A method according to claim 1, wherein the float is submerged to a depth calculated from the following equation:

$$D = L/2\pi;$$

where
D equals the depth of the float,
L equals the half-wave length of the swell, and
$\pi$ equals a constant of 3.14.

8. Apparatus for collecting energy from a swell in a fluid medium, comprising a mobile float means which is displaceable in response to the movement of a swell, said float means being submergible in a fluid medium at a predetermined depth selected such that, in the absence of movement of the fluid medium, the upwardly and downwardly directed forces acting on said float means counterbalance each other so that said float means is in equilibrium at such predetermined depth, and adjustment means for adjusting the buoyancy of said float means so as to maintain it in equilibrium.

9. Apparatus according to claim 8, wherein said float means includes a plurality of floats which are displaceable in response to movements of the swell, each of said plurality of floats being submergible in the fluid medium at a predetermined depth selected such that, in the absence of movement of the fluid medium, the upwardly and downwardly directed forces acting on the float counterbalance each other so that the float is in equilibrium at such predetermined depth, said adjustment means adjusting the buoyancy of each of said plurality of floats so as to maintain each of the floats in equilibrium.

10. Apparatus according to claim 9, wherein all of the floats are integrally joined together to form a single unit, said floats being arranged in at least one generally horizontal row.

11. Apparatus according to claim 9, wherein at least two of the floats are spaced apart one above the other, said at least two of the floats being integrally joined together to form a single unit.

12. Apparatus according to claim 8, wherein said float means is a hollow disc, the upper and lower surfaces of which are slightly convex.

13. Apparatus according to claim 12, wherein said adjustment means includes a passageway communicating with the interior of said disc, supply means for supplying a liquid to said interior of said disc through said passageway, discharge means for discharging liquid from said interior of said disc through said passageway, and control means for controlling the supply and discharge of liquid to and from said interior of said disc in response to changes in density of the fluid medium and in the period of the swell.

14. Apparatus according to claim 8, further comprising convertor means for converting the displacement of said float means into another form of energy.

15. Apparatus according to claim 14, wherein said float means is connected to said convertor means by a pivotable beam.

16. Apparatus according to claim 15, wherein said float means is pivotally mounted on said beam to one side of the pivot axis thereof.

17. Apparatus according to claim 16, further comprising a weight mounted on said beam to the other side of said pivot axis thereof.

18. Apparatus according to claim 17, wherein said adjustment means includes control means for varying the position of said weight with respect to said pivot axis of said beam in response to changes in density of the fluid medium and in the period of the swell.

19. Apparatus according to claim 15, wherein said convertor means is located onboard a seafaring vessel.

20. Apparatus according to claim 19, wherein said vessel includes means for changing its bearing, whereby the orientation of said beam can be adjusted so that said beam is substantially perpendicular to the direction of propogation of the swell.

* * * * *